US009582594B2

(12) United States Patent
Pignataro et al.

(10) Patent No.: US 9,582,594 B2
(45) Date of Patent: *Feb. 28, 2017

(54) METHOD AND SYSTEM FOR CENTRALIZED ISSUE TRACKING

(71) Applicant: Cisco Technology, Inc., San Jose, CA (US)

(72) Inventors: Carlos M. Pignataro, Raleigh, NC (US); Gonzalo A. Salgueiro, Holly Springs, NC (US); Joseph Michael Clarke, Cary, NC (US); Rodney Dunn, Benson, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/626,510

(22) Filed: Feb. 19, 2015

(65) Prior Publication Data

US 2015/0161280 A1    Jun. 11, 2015

Related U.S. Application Data

(63) Continuation of application No. 14/294,974, filed on Jun. 3, 2014, now Pat. No. 9,020,949, which is a
(Continued)

(51) Int. Cl.
*G06F 17/30* (2006.01)

(52) U.S. Cl.
CPC .. *G06F 17/30876* (2013.01); *G06F 17/30194* (2013.01); *G06F 17/30536* (2013.01); *G06F 17/30563* (2013.01)

(58) Field of Classification Search
CPC ..... G06F 17/00; G06F 17/20; G06G 17/3061; H04L 41/5074
(Continued)

(56) References Cited

U.S. PATENT DOCUMENTS 5,408,677 A    4/1995 Nogi
6,003,028 A   12/1999 Koenig
(Continued)

FOREIGN PATENT DOCUMENTS

CN    1571970 A    1/2005

OTHER PUBLICATIONS

International Search Report received in corresponding International Patent Application No. PCT/US2013/033425, dated Jun. 20, 2013.
(Continued)

*Primary Examiner* — Baoquoc N To

(57) ABSTRACT

In one embodiment, a method for facilitating centralized issue tracking. The method includes receiving information on a case from an issue tracking system (case information). The method facilitates executing a tagging method stored in a memory device that reads the case information, determines whether a part of the case information is desired information, and then tags the desired information. Finally, the method facilitates communicating the tagged information to a centralized database, where the centralized database stores the tagged information, and where the tagged information is accessible to the issue tracking system and at least one other issue tracking system.

20 Claims, 8 Drawing Sheets

Related U.S. Application Data continuation of application No. 13/434,388, filed on Mar. 29, 2012, now Pat. No. 8,799,230.

(58) Field of Classification Search
 USPC .......... 707/999.003, 999.004, 740, 705, 706
 See application file for complete search history.

(56) References Cited

U.S. PATENT DOCUMENTS

| | | | |
|---|---|---|---|
| 6,219,648 B1* | 4/2001 | Jones | G06Q 10/06311 340/506 |
| 7,376,634 B2* | 5/2008 | Liu et al. | 706/61 |
| 8,265,282 B2* | 9/2012 | Alessio et al. | 380/278 |
| 8,271,952 B2 | 9/2012 | Jain et al. | |
| 8,345,541 B2* | 1/2013 | Milinski et al. | 370/225 |
| 8,781,390 B2* | 7/2014 | Bakir | 434/350 |
| 2004/0205629 A1* | 10/2004 | Rosenholtz | G06F 17/30861 715/207 |
| 2005/0137723 A1* | 6/2005 | Liu et al. | 700/45 |
| 2005/0251425 A1 | 11/2005 | Fox | |
| 2007/0096930 A1 | 5/2007 | Cardoso | |
| 2007/0116185 A1* | 5/2007 | Savoor | H04M 3/5191 379/9 |
| 2008/0155564 A1* | 6/2008 | Shcherbina | G06Q 10/06 719/318 |
| 2009/0073964 A1* | 3/2009 | Milinski et al. | 370/352 |
| 2009/0299905 A1 | 12/2009 | Mestha et al. | |
| 2010/0088134 A1 | 4/2010 | Nielsen et al. | |
| 2010/0223597 A1 | 9/2010 | Jain et al. | |
| 2012/0110515 A1* | 5/2012 | Abramoff | G06F 17/30994 715/854 |
| 2012/0246192 A1 | 9/2012 | Kenyon | |
| 2013/0031140 A1 | 1/2013 | Ferringer et al. | |
| 2013/0074038 A1 | 3/2013 | Fox et al. | |

OTHER PUBLICATIONS

Rokach et al., Informational Retrieval System for Medical Narrative Reports, In: Field Programmable Logic and Application, vol. 3055, pp. 217-228, Jan. 1, 2004.

International Preliminary Report on Patentability received in corresponding International Patent Application No. PCT/US2013/033425, dated Oct. 9, 2014.

English translation of the First Office Action in counterpart Chinese Application No. 201380017542.3, issued Oct. 8, 2016, 8 pages.

\* cited by examiner

METHOD AND SYSTEM FOR CENTRALIZED ISSUE TRACKING

PRIORITY

This is a continuation of U.S. patent application Ser. No. 14/294,974 filed on Jun. 3, 2014, and U.S. patent application Ser. No. 13/434,388 filed on Mar. 29, 2012, issued as U.S. Pat. No. 8,799,230 on Aug. 5, 2014, the contents of which are hereby incorporated herein by reference in their entirety.

FIELD

The present disclosure relates generally to issue tracking systems.

BACKGROUND

Issue tracking system(s) (ITS), also commonly known as trouble ticket systems, are computer systems that manage tracking issues within an organization, service, and/or product. ITS are commonly used by customer support departments or internal support departments, such as a company's information technology department. Also, ITS typically includes a knowledge base containing information on end users, common issues, solutions for such issues, and the like.

A ticket (also known as a case) is a basic element stored within an issue tracking system, which includes information on a particular issue. The information can include particulars with respect to issues concerning an end user, solutions provided by support staff to remedy the issues, other parties involved, timing of the issues and the solutions, and the like. Also, a ticket, being an element of an information system can include various identifiers and links, including a unique identifier that identifies a particular ticket.

For the most part, architectures of ITS are well known. Typically, an ITS includes one or more databases that are managed by a business logic layer. The logic layer provides for organizing and reporting raw data collected by the ITS, so that end users, such as support staff can better serve their clients (who are also end users). Further, the data can include historical and real-time data, so that staff can learn to improve support processes and so they can provide immediate support for urgent issues.

Furthermore, ITS and other IS providers have developed architectures that provide federated knowledge bases, so that information collected in an ITS can be merged with information collected from other resources of an organization, such as a computerized accounting system and other information systems. However, these systems typically rely on originating from a common software framework or are at least being supported by a common software framework.

DESCRIPTION OF EXAMPLE EMBODIMENTS

Overview

Figure 1:
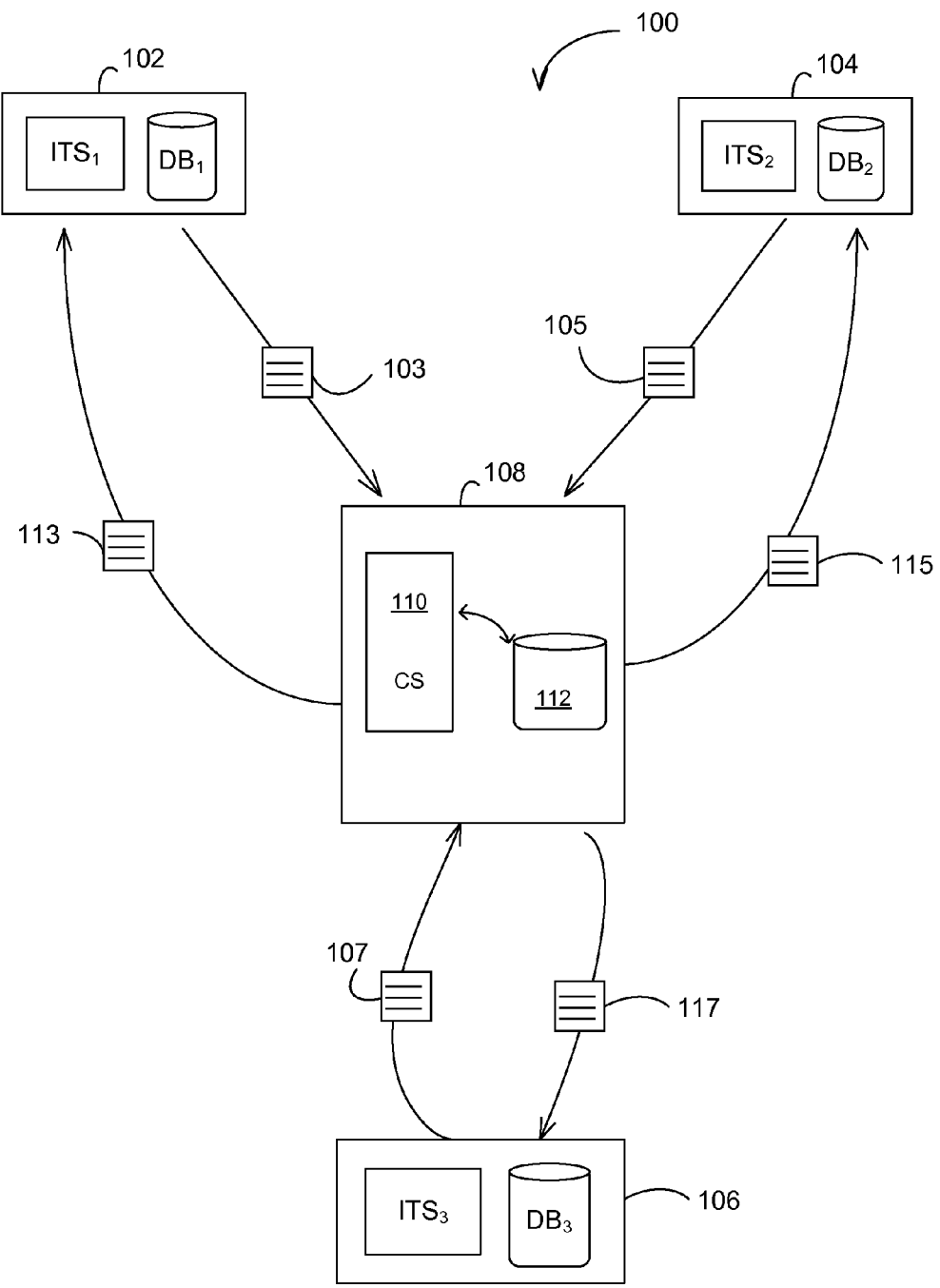
FIG. 1 illustrates a block diagram of an example network that can implement an example centralized issue tracking system.

In one embodiment, a method for centralized issue tracking that includes receiving information on a case from an issue tracking system (case information), and executing a tagging method, stored in a memory device, that reads the case information and determines whether a part of the case information is desired information. Further, via the tagging method, the method tags the desired information due to the part of the case information being desired information, and then communicates the tagged information to a centralized database. The centralized database stores the tagged information, and the tagged information is accessible to the issue tracking system and at least one other issue tracking system.

Example Embodiments

Various embodiments described herein can be used alone or in combination with one another. The foregoing detailed description will describe only a few of the many possible implementations of the present embodiments. For this reason, this detailed description is intended by way of illustration, and not by way of limitation.

As mentioned above, merging an issue tracking system(s) (ITS) with other information systems, such as another ITS, typically relies on the systems originating from a common software framework or are at least being supported by a common software framework. Additionally, it is rare to see a knowledge base derived from two different ITS, especially, if the ITS are provided by different ITS developers or vendors. In cases, where there are different ITS utilized in a federated system, typically each ITS has its own knowledge base, and another layer, such as a business logic layer, generates an additional knowledge base that merges the individual knowledge bases of each ITS. This requires further resources, such as further processing and storage. Therefore, it is of great interest to develop a system that enables centralized issue tracking from another point of control, so that one sharable knowledge base can be generated from different ITS without dedicating an additional business logic layer to merge respective knowledge bases of each ITS. Described herein is a system for performing such functionality (hereinafter the centralized issue tracking system) by way of a tagging method that distinguishes and tags information that is desired to be stored in a centralized knowledge base (e.g., information that is germane to any ITS, and/or information that is not proprietary or confidential) (hereinafter desired information).

In one aspect of the centralized issue tracking system, the point of control that enables the centralized issue tracking is at a computer program (hereinafter the centralizing software) that includes the tagging method. The centralizing software runs the tagging method on an electronic file, e.g. a case log file, which results in a tagged file. The tagging method can tag the case file with its header and/or its body. For example, the tagging method can tag the case file at section or paragraph headers or within lines or paragraphs of a section. Information tagged as desirable in the case file is then inputted by a component of the centralized issue tracking system, e.g., the centralizing software, into the centralized knowledge base according to metadata contained in respective tags of the information. Also, in some embodiments, the entire file can be inputted into the centralized knowledge base, where the file contains the desired information.

FIG. 1 illustrates a block diagram of an example network 100 that can implement an example embodiment of the centralized issue tracking system. The network 100 includes multiple ITS, e.g., an ITS 102, an ITS 104, and an ITS 106, that communicate with a centralizing node 108 of the network 100. Each of the ITS 102, 104, and 106 and the centralizing node are computational nodes of the network 100. The network 100 can enable processing of different aspects of the centralized issue tracking system on a plurality of processors located at one or more of the computational nodes 102, 104, 106, and 108. Each of the computational nodes 102, 104, 106, and 108 can be one or more of any electronic device that can perform computations, such as a general-purpose computer, a mainframe computer, a workstation, a desktop computer, a laptop computer, a mobile device, and so forth. Also, each of the computational nodes 102, 104, 106, and 108 can include a business logic layer (e.g., a centralizing software 110 of the centralizing node 108) and a knowledge base (e.g., a database 112 of the centralizing node).

As mentioned, the computational nodes 102, 104, 106, and 108 communicate via the network 100, which can be any wired and/or wireless communications network including any Local Area Network (LAN) and/or Wide Area Network (WAN). Also the network 100 can be implemented in any variety or combination of distributed computing architectures, including, a 2-tier architecture (client-server architecture), an N-tier architecture, a peer-to-peer architecture, a tightly-coupled architecture, a service-oriented architecture (e.g., a cloud computing infrastructure), a mobile-code-based architecture, a replicated-repository-based architecture, and so forth.

The ITS 102, 104, and 106 can communicate respective files of case information 103, 105, and 107 to the centralizing node 108, where the centralizing software 110 performs the tagging method. The desired information, tagged by the tagging method, is then inputted into the database 112 of the centralizing node 108. Also, the database 112 can communicate information back to the centralizing software 110. For example, the database 112 can communicate metadata field updates for tags utilized by the tagging method to the centralizing software 110. Further, the centralizing node 108 can communicate queried desired information 113, 115, and 117 to the ITS 102, 104, and 106, respectively.

Figure 2:
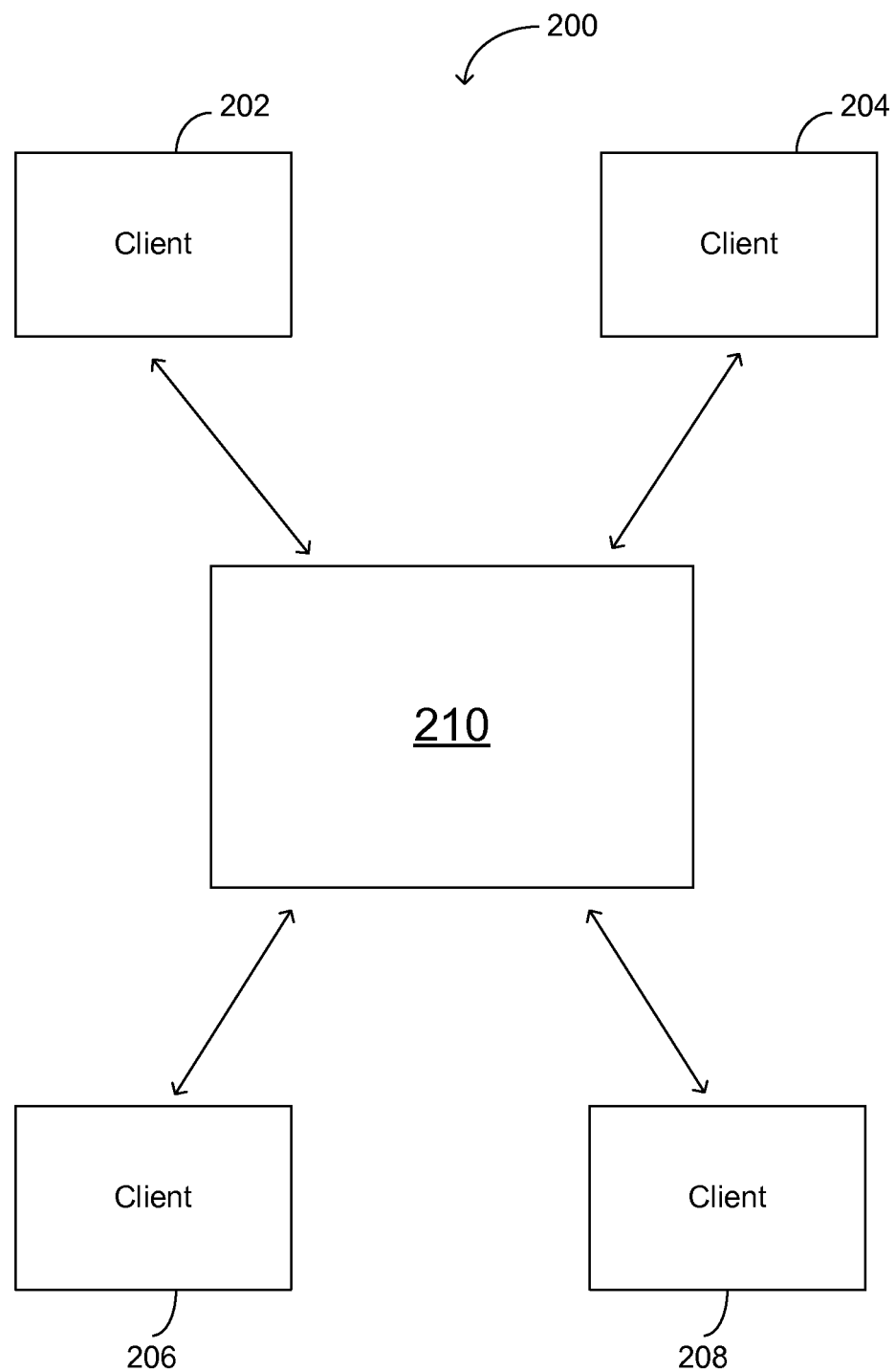
FIG. 2 illustrates a block diagram of an example sub-network of the network of FIG. 1.

FIG. 2 illustrates a block diagram of an example sub-network 200 of the network of FIG. 1. Each of the computational nodes 102, 104, 106, and 108 of FIG. 1 can be a sub-network such as the sub-network 200. As depicted, the sub-network 200 is a 2-tier architecture (client-server architecture) having client electronic devices 202, 204, 206, and 208 (which can be thin clients or thick clients), and a server electronic device 210 that can store and run ITS software. For example, the server device 210 can be a component of the ITS 102, 104, and/or 106, and/or can store and run the centralizing software 110 and the database 112. In the first case, the client devices 202, 204, 206, and 208 can be available to customer end users and support staff, whereas in the latter case the client devices can only be available to administrators of the centralized issue tracking system or at most support staff.

Figure 3:
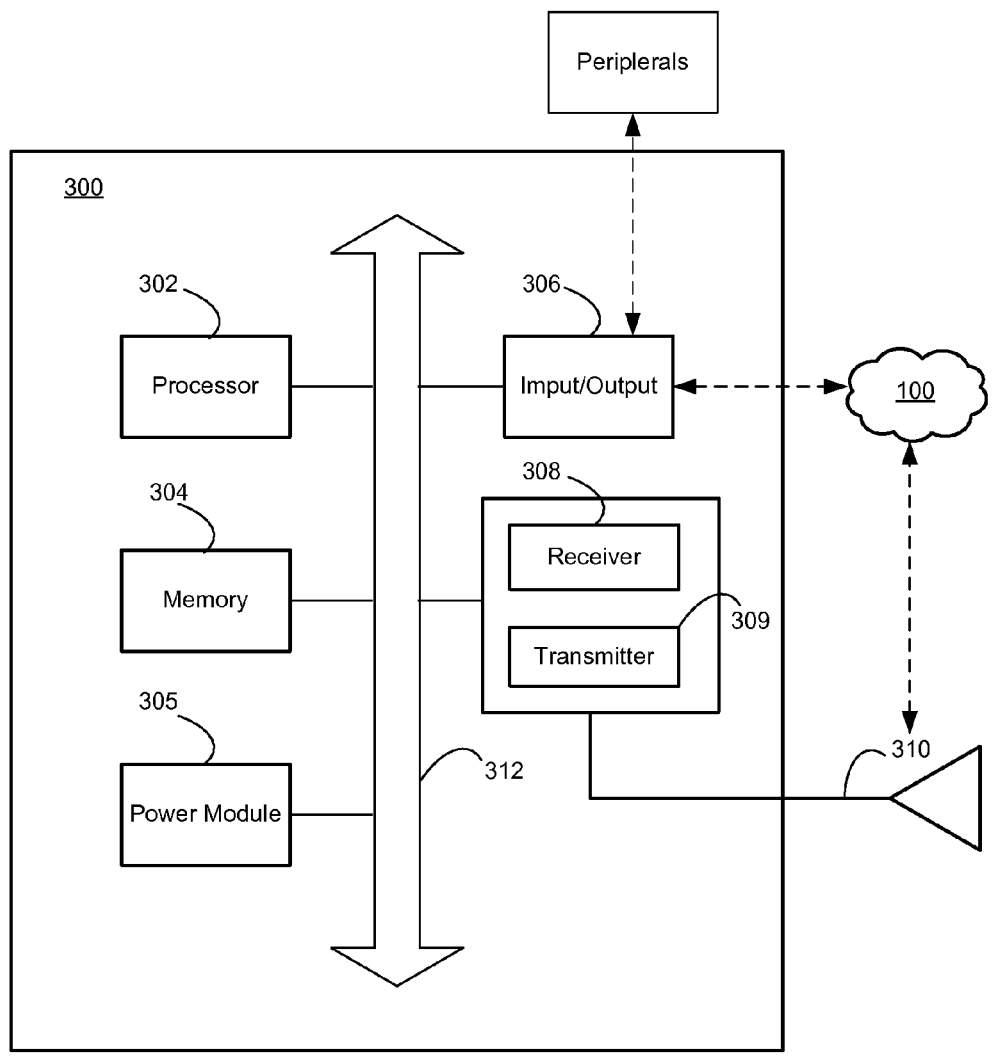
FIG. 3 illustrates a block diagram of an example electronic device that can implement an aspect of an example centralized issue tracking system.

FIG. 3 illustrates a block diagram of an example electronic device 300 that can implement an aspect of an example centralized issue tracking system. Instances of the electronic device 300 can be the server electronic device 210 of a 2-tier architecture, the centralizing node 108, and/or any other electronic device or set of electronic devices capable of at least storing and executing the centralizing software 110 and the database 112 and communicating with other nodes of the centralized issue tracking system. Also, instances of the electronic device 300 can be the client devices 202, 204, 206, 208, the ITS 102, 104, and 106, and/or any other node of the centralized issue tracking system, whether the electronic device is a thin client or a computational node.

The electronic device 300, which can be a combination of multiple electronic devices (e.g., where the centralizing node 108 is a combination of multiple electronic devices), includes a processor 302, memory 304, a power module 305, input/output 306 (including input/out signals and internal, peripheral, user, and network interfaces), a receiver 308 and a transmitter 309 (or a transceiver), an antenna 310 for wireless communications, and a communication bus 312 that connects the aforementioned elements of the electronic device. The processor 302 can be one or more of any type of processing device, such as a central processing unit (CPU). Also, for example, the processor 302 can be central processing logic; central processing logic includes hardware, firmware, software and/or combinations of each to perform a function(s) or an action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software. The memory 304, such as RAM or ROM, can be enabled by one or more of any type of memory device, such as a primary (directly accessible by the CPU) and/or a secondary (indirectly accessible by the CPU) storage device (e.g., flash memory, magnetic disk, optical disk). The power module 305 contains one or more power components, and facilitates supply and management of power to the electronic device 300. The input/output 306, can include any interfaces for facilitating communication between any components of the electronic device 300, components of external devices (such as components of other devices of the network 100), and end users. For example, such interfaces can include a network card that is an integration of the receiver 308, the transmitter 309, and one or more I/O interfaces. The network card, for example, can facilitate wired or wireless communication with other nodes of the network 100. In cases of wireless communication, the antenna 310 can facilitate such communication. Also, the I/O interfaces, can include user interfaces such as monitors, keyboards, touchscreens, microphones, and speakers. Further, some of the I/O interfaces and the bus 312 can facilitate communication between components of the electronic device, and in some embodiments ease processing performed by the processor 302.

Figure 4:
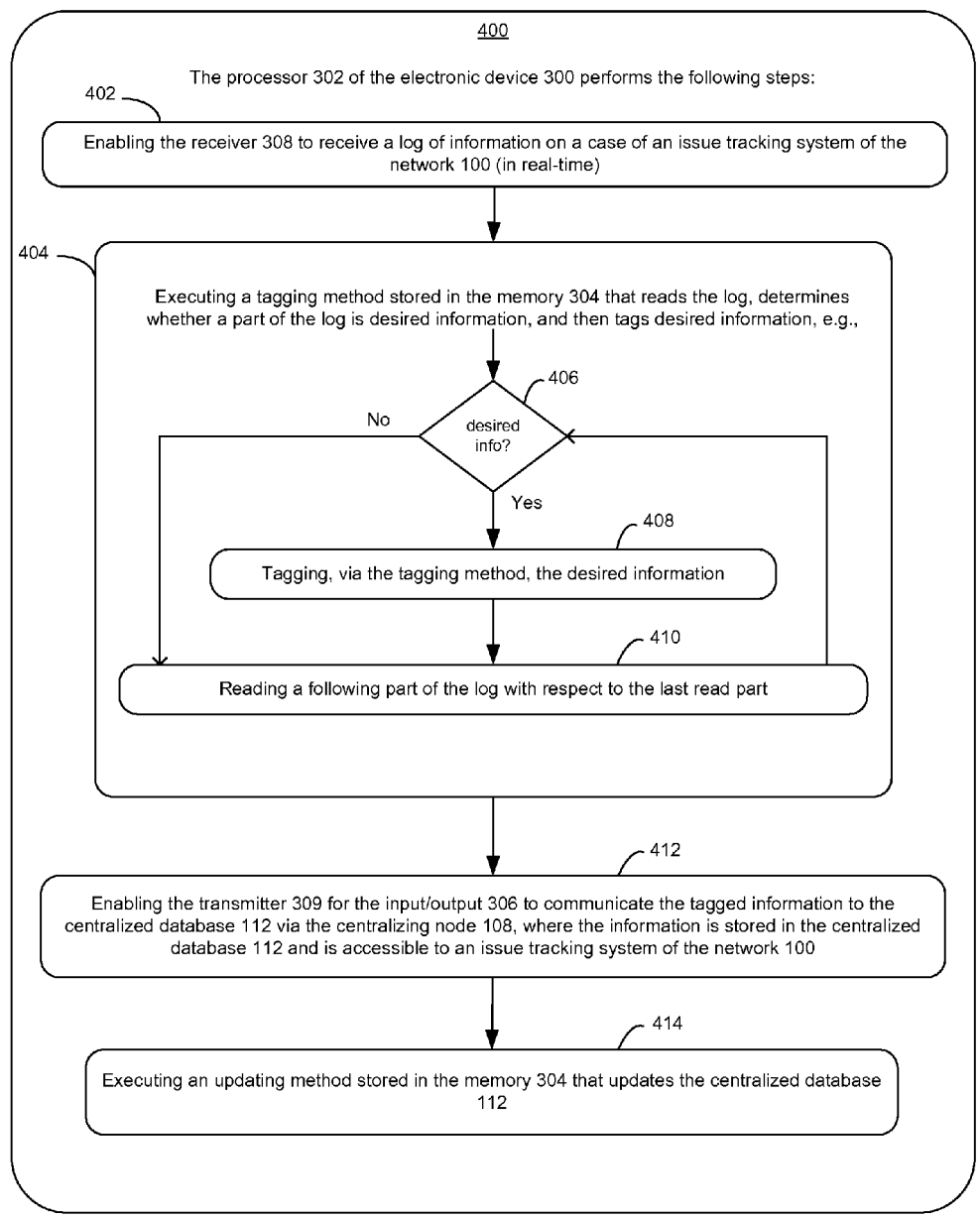
FIG. 4 illustrates a flow chart of a method performed by the electronic device of FIG. 3.

FIG. 4 illustrates a flow chart of an example method 400 performed by the electronic device of FIG. 3. In some embodiments, the processor 302 performs the method 400 by executing processing device readable instructions encoded in the memory 304. In some embodiments, the device readable instructions encoded in the memory 304 include the centralizing software 110 and the database 112.

The method 400 starts with enabling the receiver 308 to receive information on a case of an issue tracking system (case information) at a step 402. In some embodiments, the receiver 308 is part of the centralizing node 108, and the receiver receives one of the files of case information 103, 105, or 107 from one of the issue tracking systems 102, 104, or 106 of the network 100. In some embodiments, the receiving of the case information can occur in real-time. For example, a response including the case information resulting from a request for the case information can occur in the order of milliseconds and even microseconds under certain conditions. Also, the receiver 308, in some embodiments, can receive the case information in the form of multiple case logs, where the receiver receives the case logs in parallel or serially, and can combine the multiple case logs in to one case log or keep individually received case logs separate from each other, depending on a desired implementation.

At a step 404, the method 400 executes a tagging method stored in the memory 304 that reads the case information, determines whether a part of the case information is desired information, and then tags desired information. For example, as shown in FIG. 4, at a step 406 the tagging method determines whether a part of the case information, such as text data of a field or a portion of the text data, is desired information. If the part is desired information then the tagging method at a step 408 tags the desired information. If the part is not desired information then the tagging method reads another part of the case information at a step 410, such as an immediate following part of the case information. The tagging method, in these embodiments, then repeats the steps 406, 408, and 410 until the case ends or is closed to receiving information. In some embodiments, the tagging method can tag parts of the case information the tagging method has read, so that a part of the information is not read more than once.

In some embodiments, the desired information includes any information that is universally relevant to an ITS of the centralized ITS system. Also, the desired information can be restricted to information that is public or at least shared information amongst individuals or entities using the centralized ITS system. For example, the desired information can include a symptom or description of a problem in an ITS, a cause or trigger that lead to a problem in an ITS being manifested, a root cause description of a problem in an ITS, or a resolution to a problem in an ITS. Examples of a symptom or a description of a problem can include an output of operational parameters of an ITS when a problem. These symptoms can be coupled with a detailed explanation of unexpected behavior that is encountered when the problem is occurring. Examples of a trigger include a list of causes of a problem or an environmental issue that can be seen before a problem of an ITS will occur (e.g., a specific device-to-device or a human-to-device interaction that can cause an ITS problem). A root cause description would contain information about a root or ultimate trigger for a problem. Triggers can also be ancillary to or at a higher level from a root cause. The centralized ITS can use a root cause to project risk of other triggers that can occur. Further, a resolution summary provides details on actions to take to resolve a problem including any workarounds or mitigations.

At a step 412, the method 400 enables the transmitter 309 and/or interfaces of the input/output 306 to communicate the tagged information to a centralized knowledge base. For example, such is communicated to the database 112 of the centralizing node 108 where the information is stored in the centralized database 112 and is accessible to any one of the ITS 102, 104, and 106 of the network 100. Next, at a step 414, the method 400 executes an updating method stored in the memory 304 that can update the centralized database 112 (e.g., updates fields of the centralized database with respect to the tagged information) and in some embodiments can also update or facilitate updating respective databases of the ITS 102, 104, and 106 of the network 100. For example, the centralizing node 108 can communicate queried desired information 113, 115, and 117 to the ITS 102, 104, and 106, respectively. Also, the centralized database 112 can communicate updates to the centralizing software 110. For example, the centralized database 112 can communicate metadata field updates for tags utilized by the tagging method.

Figure 5:
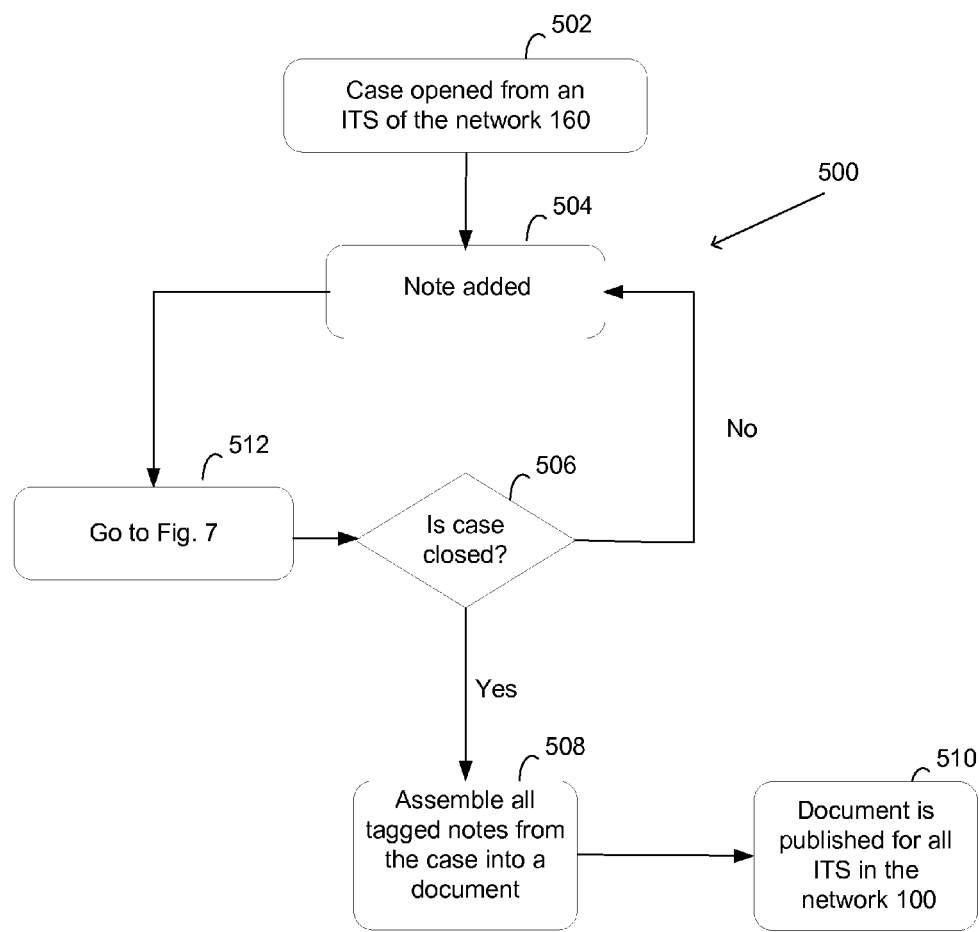
FIG. 5 illustrates a flow chart of another method that can be performed by the electronic device of FIG. 3.

FIG. 5 illustrates a flow chart of another example method 500 that can be performed by the electronic device 300 of FIG. 3. Initially, at a step 502, the electronic device 300 can open a case from one of the ITS 102, 104, or 106 of the network 100. At a step 504, the electronic device 300 can enable entering a note to a respective case information file. Then, an end user can continue to enter notes into the respective case information file until the respective ITS determines that the case is closed at a step 506. Then at a step 508, the electronic device 300 can assemble all tagged notes having desired content from the case into a document, where a tagging method tags the notes at a step 512 (See FIG. 7). Finally, the electronic device 300 can publish a document for all the ITS 102, 104, and 106 in the network 100; and in some embodiments, the electronic device can publish the document for all users of the network 100.

Figure 6:
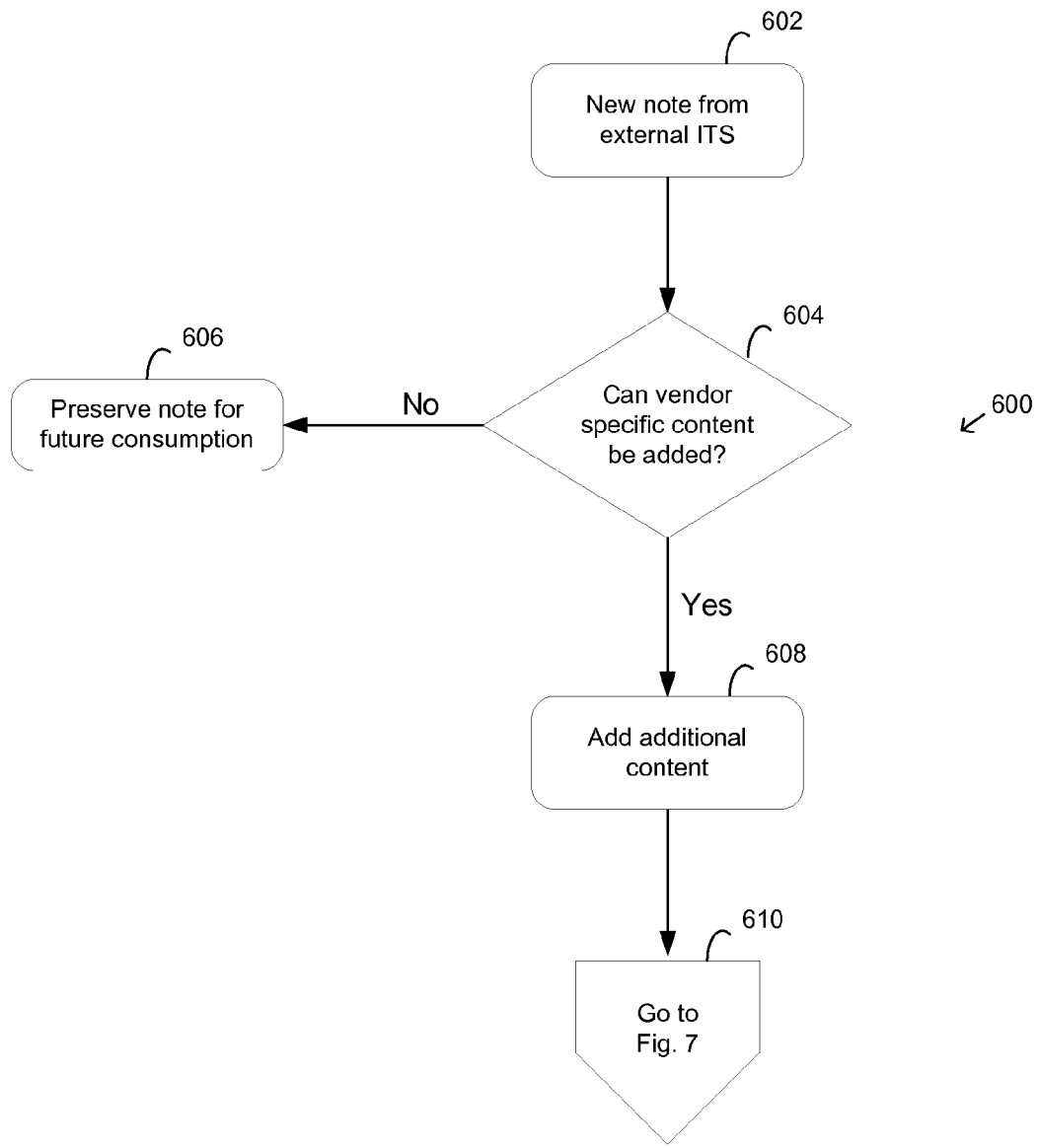
FIG. 6 illustrates a flow chart of another method that can be performed by the electronic device of FIG. 3.

FIG. 6 illustrates a flow chart of another example method 600 that can be performed by the electronic device 300 of FIG. 3. Initially, at a step 602, the electronic device can receive a note of a case information from a ITS external to the network 100. Next, at a step 604, the electronic device 300 can determine whether vendor specific information related to the external ITS can be added to the note. If the vendor specific information cannot be added, then at a step 606, the note is stored, e.g. stored in a memory device of the electronic device 300 or a database of any of the nodes of the network 100. If the electronic device 300 can add the vendor specific information, then at a step 608, the information is added to the note; and then a tagging method tags the information of the note at a step 610 (See FIG. 7).

Figure 7:
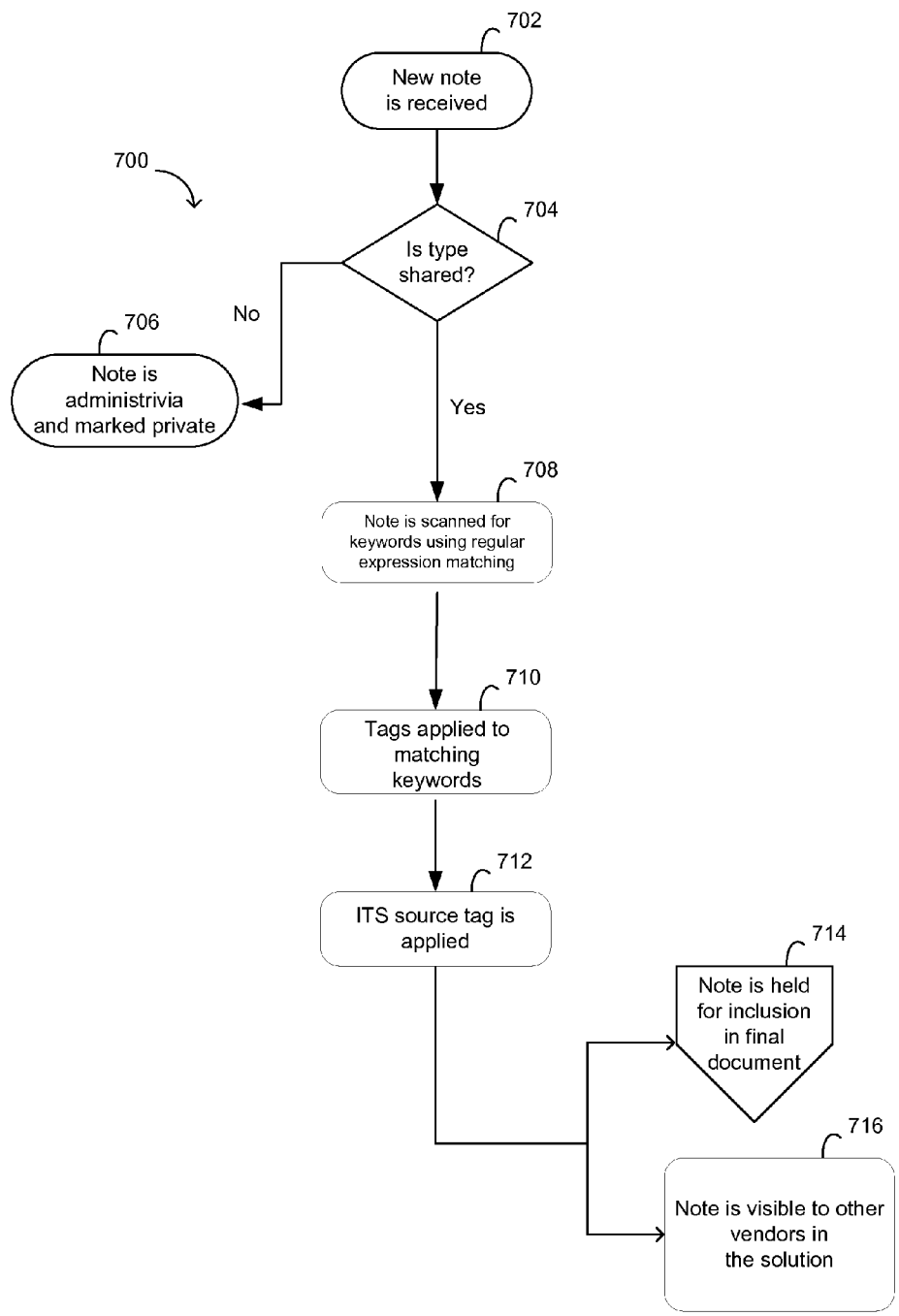
FIG. 7 illustrates a flow chart of another method that can be performed by the electronic device of FIG. 3.

FIG. 7 illustrates a flow chart of another method 700 that can be performed by the electronic device 300 of FIG. 3. In particular, FIG. 7 illustrates a flow chart of an example tagging method that can be the aforementioned tagging method of FIGS. 4-6. To begin, at a step 702, the tagging method 700 can receive a note on case information. At a step 704, the method 700 can determine whether the note is of a type that can be shared at least amongst the nodes of network 100. If not, at a step 706, the method 700 can mark the note as private or confidential; and therefore the note cannot be shared. If the note is determined to be sharable, then at a step 708, the method 700 can scan the note for keywords using regular expression matching. In some embodiments, the keywords are stored or derived from a database of keywords. Also, in some embodiments, the determination that the note or information is not to be shared or is undesired can be based on whether the note or information only comprises administrivia. Adminstrivia in the context of this disclosure is text that presents trivial logistics of a case or issue, such as time of day an issue was resolved, the phone number of a secretary of an end user having the issue, the location and time to discuss the issue, or any other logistics or facts unrelated to solution of an issue. Information that is not considered administrivia and is worthy of tagging includes, for example, a solution for an issue being tracked, who resolved the issue, contact information of the individual(s) who solved the issue, etc.

At a step 710, the method 700 can tag the matching keywords, and at a step 712, the method can also tag the note with an identifier that identifies a source of the note, e.g., the ITS that originated the note. Lastly, at steps 714 and 716, respectively, the method 700 can facilitate storing the note for including the note in a shared document and can make the note available to view from the nodes of the network 100.

Figure 8:
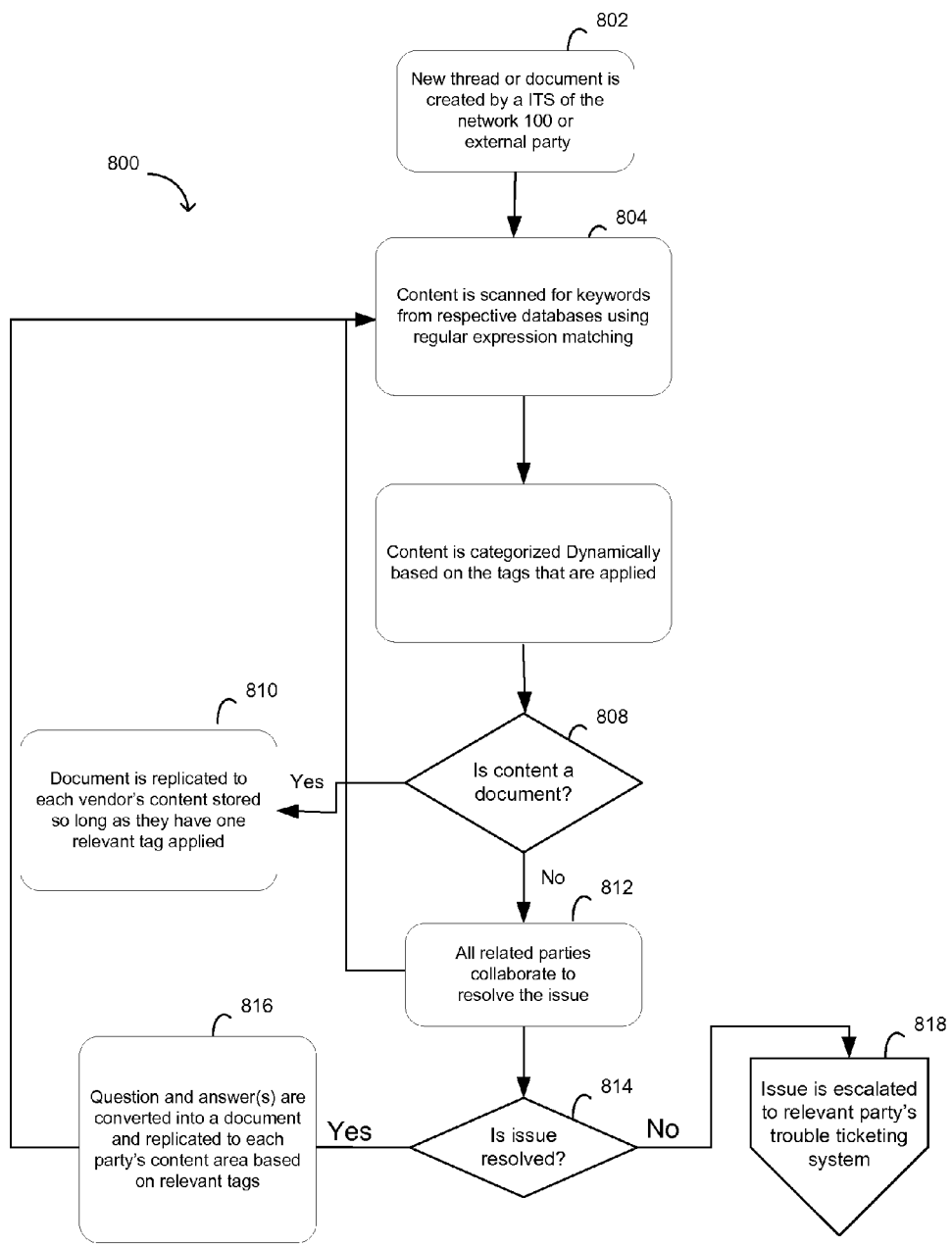
FIG. 8 illustrates a flow chart of another method that can be performed by the electronic device of FIG. 3 and an example electronic device external to the network of FIG. 1.

FIG. 8 illustrates a flow chart of another method 800 that can be performed by the electronic device 300 of FIG. 3 and an example electronic device external to the network of FIG. 1. To start, at a step 802, a new thread, document, case log, or the like (the case input or also referred to as the case information) can be created by one of the ITS 102, 104, or 106 of the network 100 or by an external party, such as an ITS external to the network 100. Then the method 800, at a step 804, can scan the case input for keywords using regular expression matching and tag the keywords appropriately, where the keywords can come from or be derived from a respective database of the source of the case input, such as one of the ITS 102, 104, or 106, or an external ITS. Then, at a step 806, the method 800 can categorize content of the case input based on the tags, and determine, at a step 808, whether the content is part of a valid document, where parameters of a valid document can be predetermined by an ITS or any other system or user of a system. If the content is part of a valid document, the document is copied to or updated at each respective storage device of the nodes of the network 100 and any appropriate electronic device external to the network, at a step 810. Otherwise, at a step 812, all relevant parties associated with the case input can collaborate to resolve issues with the content and the document, such as a clerical error, incorrect file or text formatting, or data corruption. The steps 804, 806, and 808 can be repeated while the issues are being resolved. Also, if it is determined that the issue is resolved at a step 814, at a step 816, the method 800 can facilitate converting communications between the parties into a document. Further, the method can facilitate replicating the document and storing the document to each respective storage device of the nodes of the network 100 and any appropriate electronic device external to the network. As depicted in the figure, the method 800 can then scan this last document for keywords at the step 804 and repeat the steps following the step 804. Further, if the issues are not resolved, such issues can be escalated to a relevant party's ITS at a step 818.

Various embodiments described herein can be used alone or in combination with one another. The foregoing detailed description has described only a few of the many possible implementations of the present embodiments. For this reason, this detailed description is intended by way of illustration, and not by way of limitation.

The invention claimed is:

1. A method, comprising:
   generating a case log file at a first issue tracking system;
   receiving the case log file from the first issue tracking system at a centralized issue tracking system, the case log file including issue tracking information entered for a trouble ticket at the first issue tracking system;
   identifying, by a central processing unit of a server hosing the centralized issue tracking system, the issue tracking information from the case log file;
   identifying, by the central processing unit, a part of the issue tracking information that matches to a pre-selected category of issue tracking information universally relevant to all issue tracking systems coupled to the centralized issue tracking system including a second issue tracking system; and
   modifying, by the central processing unit, the issue tracking information by tagging a header portion of the case log file to indicate that the part of the issue tracking information includes desired information universally relevant to all issue tracking systems coupled to the centralized issue tracking system including the second issue tracking system.

2. The method of claim 1, further comprising communicating, by the central processing unit to a database, the modified issue tracking information.

3. The method of claim 2, wherein the database is accessible by the first issue tracking system, the second issue tracking system, or both.

4. The method of claim 1, wherein the modifying of the issue tracking information includes tagging the part of the issue tracking information that includes the pre-selected category of issue tracking information.

5. The method of claim 1, wherein the identifying of the part includes using a sequence of characters that forms a search pattern.

6. The method of claim 5, wherein the search pattern includes a regular expression, a keyword, or both.

7. The method of claim 1, wherein the pre-selected category of issue tracking information includes a solution for a tracked issue with a product, a service, or both.

8. The method of claim 1, wherein the pre-selected category of issue tracking information includes a person or a group of people that determined a solution for a tracked issue with a product, a service, or both.

9. The method of claim 1, wherein the pre-selected category of issue tracking information includes contact information of a person or a group of people that determined a solution for a tracked issue with a product, a service, or both.

10. An apparatus, comprising:
    tagging method circuitry configured to:
       receive a case log file from a first issue tracking system at a centralized issue tracking system, the case log file being generated at the first issue tracking system and including issue tracking information entered for a trouble ticket at the first issue tracking system;
       identify a part of the issue tracking information that matches to a pre-selected category of issue tracking information universally relevant to all issue tracking systems coupled to the centralized issue tracking system including a second issue tracking system; and
       tag the issue tracking information by tagging a header portion of the case log file to indicate that the part includes desired information universally relevant to all issue tracking systems coupled to the centralized issue tracking system including the second issue tracking system; and
    input/output circuitry configured to communicate the tagged issue tracking information.

11. The apparatus of claim 10, wherein the input/output circuitry is further configured to communicate the tagged issue tracking information to the second issue tracking system.

12. The apparatus of claim 10, wherein the input/output circuitry is further configured to communicate the tagged issue tracking information to a database accessible by the first issue tracking system, the second issue tracking system, or both.

13. The apparatus of claim 10, wherein the tagging method circuitry is further configured to identify the part of the issue tracking information that includes the pre-selected category of issue tracking information using a sequence of characters that forms a search pattern.

14. The apparatus of claim 13, wherein the search pattern includes a regular expression, a keyword, or both.

15. The apparatus of claim 10, wherein the pre-selected category of issue tracking information includes a solution for a tracked issue with a product, a service, or both.

16. The apparatus of claim 10, wherein the pre-selected category of issue tracking information includes a person or a group of people that determined a solution for a tracked issue with a product, a service, or both.

17. A non-transitory computer readable medium, comprising:
 instructions executable by a processor to receive a case log file from a first issue tracking system at a centralized issue tracking system, the case log file being generated at the first issue tracking system and including issue tracking information entered for a trouble ticket at the first issue tracking system;
 instructions executable by a processor to identify a part of the issue tracking information that matches to a pre-selected category of issue tracking information universally relevant to all issue tracking systems coupled to the centralized issue tracking system including a second issue tracking system according to a sequence of characters that forms a search pattern;
 instructions executable by a processor to tag the issue tracking information by tagging a header portion of the case log file to indicate that the part includes desired information universally relevant to all issue tracking systems coupled to the centralized issue tracking system including the second issue tracking system; and
 instructions executable by a processor to communicate the tagged issue tracking information to a database accessible by the first issue tracking system, the second issue tracking system, or both.

18. The non-transitory computer readable medium of claim 17, wherein the search pattern includes a keyword, a regular expression, or both.

19. The non-transitory computer readable medium of claim 17, wherein the pre-selected category of issue tracking information includes a solution for a tracked issue with a product, a service, or both.

20. The non-transitory computer readable medium of claim 17, wherein the pre-selected category of issue tracking information includes a person or a group of people that determined a solution for a tracked issue with a product, a service, or both.

* * * * *